United States Patent [19]

Stubbings

[11] 4,255,993
[45] Mar. 17, 1981

[54] ANGLE IRON CUTTING

[75] Inventor: James H. Stubbings, Rockville, Md.

[73] Assignee: Potomac Applied Mechanics, Inc., Bethesda, Md.

[21] Appl. No.: 54,415

[22] Filed: Jul. 3, 1979

Related U.S. Application Data

[62] Division of Ser. No. 846,216, Oct. 27, 1977, Pat. No. 4,170,910, which is a division of Ser. No. 795,088, May 9, 1977, Pat. No. 4,106,380.

[51] Int. Cl.³ .................... B26D 7/00; B23D 23/00
[52] U.S. Cl. .................................... 83/71; 83/405; 83/519; 83/563; 83/560; 83/618
[58] Field of Search .................. 83/71, 212, 255, 405, 83/513, 519, 618, 563, 560, 628, 632, 694

[56] References Cited

U.S. PATENT DOCUMENTS

| 515,746 | 3/1894 | Cameron et al. | 83/694 |
| 994,755 | 6/1911 | Kraut | 83/560 X |
| 1,241,259 | 9/1917 | Wurts | 83/519 |
| 1,446,415 | 2/1923 | Connelly | 83/519 |
| 3,498,167 | 3/1970 | Hill | 83/255 X |
| 3,854,358 | 12/1974 | Kruse | 83/552 X |

*Primary Examiner*—J. M. Meister
*Attorney, Agent, or Firm*—Cushman, Darby & Cushman

[57] ABSTRACT

A method and apparatus for acting on angle irons or the like. A vertical stack of angle irons is provided and the angle irons are fed one at a time to a punching position. At the punching position a hole of selected size is punched in the angle iron, and the angle iron is fed from the punching position in a linear direction of movement to a cutting position. The length of the angle iron to be cut is determined by measuring the length of angle iron in the direction of movement past the cutting position, and the angle iron is cut at the cutting position. Cutting is accomplished using a crankshaft with at least one cutting blade operatively connected to the crankshaft at a portion thereof offset from a line between the bushings, guide structures being provided for guiding the linear movement of the cutting blade. Each cut angle iron is removed from the cutting position in a direction normal to the linear direction of movement of the angle iron to the cutting position. A computer may be provided for controlling operation of all motors to affect selection of punch sizes and cutting blades, and to affect operation of all the power mechanisms.

1 Claim, 12 Drawing Figures

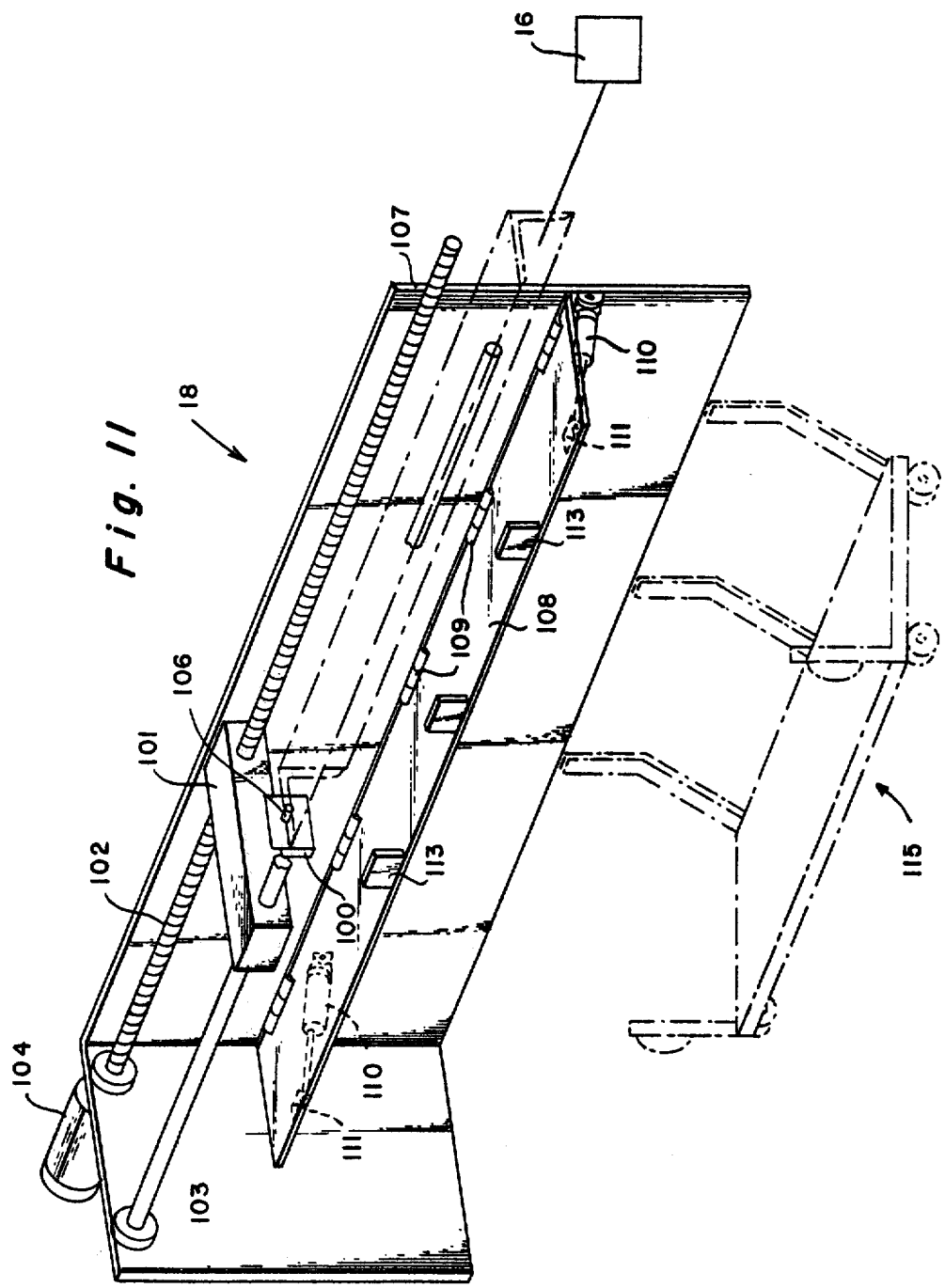

ANGLE IRON CUTTING

CROSS REFERENCE TO RELATED APPLICATIONS

This application is a divisional application of Ser. No. 846,216 filed Oct. 27, 1977, now U.S. Pat. No. 4,170,910; which in turn is a divisional of application Ser. No. 795,088 filed May 9, 1977, now U.S. Pat. No. 4,106,380.

BACKGROUND AND SUMMARY OF THE INVENTION

The invention relates to a method and apparatus for acting on angle irons or the like. The term "angle irons" as used in the ensuing specification and claims is intended to mean angle irons, rails and like elongated plane-surface construction members (which may be bent into tubes after cutting and punching).

According to the present invention, angle irons are vertically stacked and are moved from the vertical stack to positions wherein they are punched and cut. By vertically stacking the angle irons, much floor space is saved over arrangements wherein the angle irons are provided in a horizontal array. The angle irons are positively gripped and fed from the vertical stack to a punching position, and the size hole to be punched in a face of the angle iron can be automatically selected so that different size holes can be punched in the same angle iron without interruption of continuous operation and so that consecutive angle irons can have different-sized openings punched therein. The length of the angle iron is automatically determined during operation and may be changed from one angle iron to the next consecutive angle iron, again so as to allow the continuous operation of the structure according to the invention. The length of the angle iron to be cut may be determined by measuring the length of angle iron in the direction of movement thereof past the cutting position, which determination effects the ready removal of each cut angle iron from the cutting position after cutting thereof. Cutting apparatus may be provided that may be automatically moved to accommodate different shapes of angle irons to be cut and a common motor may be provided for operation of various cutting blades to affect angle iron cutting. In this way, differently shaped angle irons may be readily accommodated without the necessity of interruption of the operation and without providing separate distinct cutting power sources.

According to the method of the present invention, angle irons are acted on by providing a vertical stack of a plurality of angle irons and substantially continuously feeding the angle irons one at a time to a punching position, punching a hole in a face of the angle iron at the punching position, feeding the angle iron from the punching position to a cutting position in a linear direction of movement, automatically selectively determining the length of angle iron to be cut at the cutting position, cutting the angle iron at the cutting position to provide an angle iron of given length, and removing each cut angle iron from the cutting position. The determination of the length of angle iron to be cut is affected by measuring the length of angle iron in the direction of movement thereof past the cutting position and the angle iron is removed from the cutting position automatically in a direction normal to the linear direction of movement thereof from the vertical stack to the cutting position. The size hole to be punched in a face of each angle iron is automatically selected from a number of possible sizes. Prior to providing the vertical stack of angle irons, the angle irons may be stacked in a horizontal position and then moved to the vertical position.

According to the present invention, apparatus is provided for automatic punching and cutting of angle irons. Such apparatus comprises means for providing a supply of angle irons to be cut, means for transporting the angle irons away from the supply means, means for punching holes of predetermined size in an angle iron or the like at a punching position, and means for automatically determining the length of angle iron to be cut at a cutting position and means for cutting the angle iron at the cutting position to provide an angle iron of predetermined length. The means for providing a supply of angle irons comprises means for vertically stacking a plurality of angle irons, including a magazine that may be pivoted to a horizontal position to be loaded and then pivoted back to the vertical stacking position. The transporting means comprises a plurality of powered gripper wheels for engaging an angle iron and longitudinally moving the angle iron upon rotation thereof. The punching means comprises a plurality of male dies, each of a different size, means for selecting one of said plurality of male dies for punching a hole in an angle iron at the punching position, and power means for moving a selected male die to affect punching. A plurality of female dies are provided for cooperation with the male dies. The length determining means determines the length of angle iron past the cutting position and includes an abutment and power means for adjusting the position of the abutment with respect to the cutting position. The cutting means comprises a common cutter housing with the distinct means for cutting at least two differently shaped angle irons and a common crankshaft is provided for mounting at least two cutting blades to affect generally linear movement thereof in response to rotation of the crankshaft. Computer control means may provide for control and operation of all of the power means associated with the apparatus for truly automatic control of the angle irons from the stack prior to cutting to another stack after cutting.

It is the primary object of the present invention to provide a method and apparatus for complete control of punching and cutting operations of angle irons or the like. This and other objects of the invention will become clear from an inspection of the detailed description of the invention and from the appended claims.

BRIEF DESCRIPTION OF THE DRAWINGS

FIG. 11 is a perspective view of the exemplary measuring means according to the invention.

DETAILED DESCRIPTION OF THE INVENTION

Figure 1:
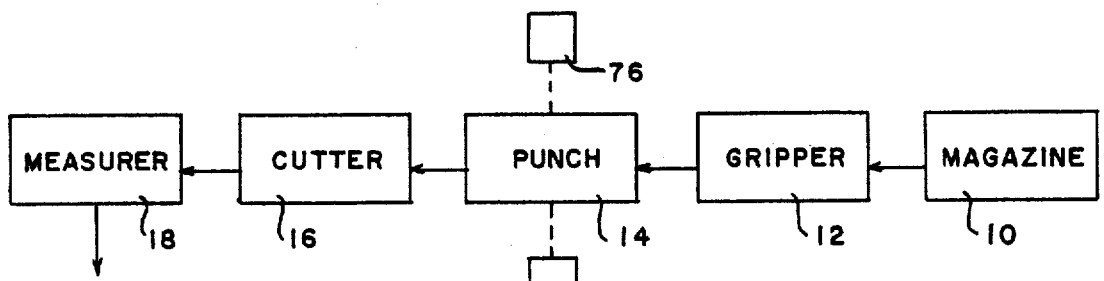
FIG. 1 is a schematic showing of the component parts according to the invention.

Exemplary apparatus according to the present invention is shown diagrammatically in FIG. 1. Such apparatus generally includes means for providing a supply of angle irons, a magazine 10, means 12 for transporting the angle irons away from the supply means 10, means 14 for punching holes of predetermined size in an angle iron at a punching position, means 18 for automatically determining the length of the angle iron to be cut at a cutting position, and means 16 for cutting an angle iron at the cutting position. Exemplary dimensions that the various components could take are 20 feet for the magazine 10, 20 feet for the transporting means 12, 36 inches for the punching means 14, 24 inches for the cutting means 16, and 20 feet for the measuring assembly 18.

Figure 2:
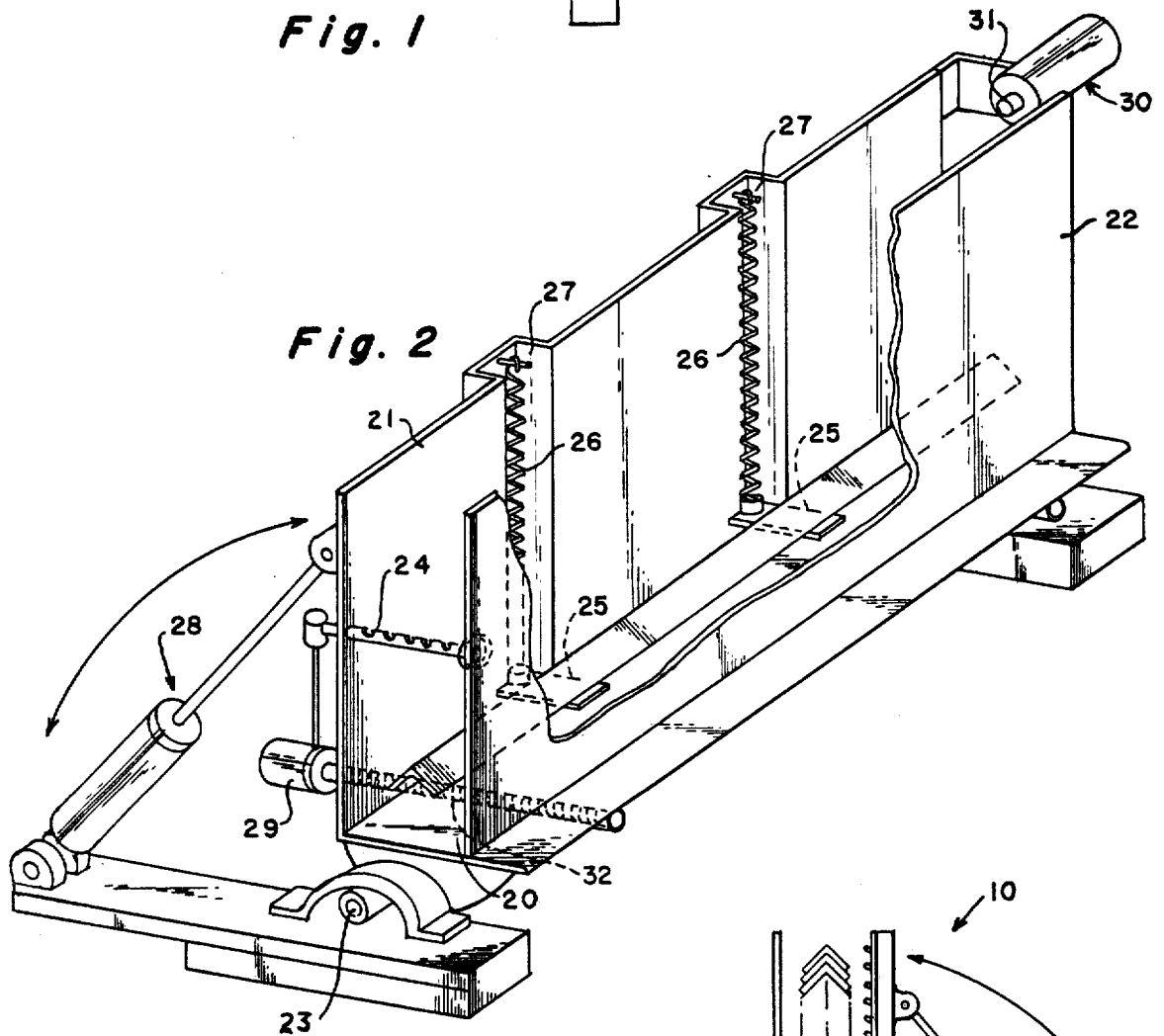
FIG. 2 is a schematic perspective view, with portions cut-away for clarity, of an exemplary magazine according to the invention.
Figure 3:
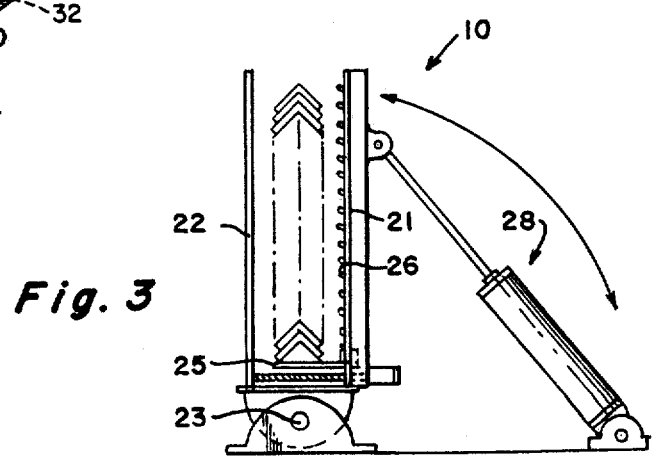
FIG. 3 is an end view of the magazine of FIG. 2.

The magazine 10, as shown most clearly in FIGS. 2 and 3, comprises means for providing a vertical stack of angle iron D. The magazine includes a bottom 20, first and second sides 21 and 22, respectively, and pivotal mounting means 23 for mounting the magazine so that it is pivotal from a first position (shown in FIG. 3) wherein the sides 21 and 22 are generally vertical and a vertical stack of angle irons D is provided to a second loading position wherein the sides 21, 22 are generally horizontal. Means are provided for biasing the angle irons D upwardly in the stack so that the top angle iron in the stack is always at generally the same vertical position, said means including one or more supporting arms 25 and a coil spring or the like 26 in operative engagement with each arm 25 and for biasing the arm 25 upwardly. A groove 27 may be provided in wall 21 for each arm 25 to guide the movement of the arm 25. Power means, such as an air or hydraulic cylinder 28, may be provided for pivoting the magazine 10 about the pivot 23 from the vertical position shown to a horizontal loading position.

Adjustment means, such as motor 29 for rotation of screw rod 30 and ratchet detent 31, can be provided for adjusting the spacing between the walls 21,22 to accommodate angle irons D of different dimensions.

A stationary ram 32 or the like, having an angle engaging proportion 33 thereof, is provided for moving the top angle iron off of the stack so that it may be acted on by the transporting means 12. The means 32 feeds the angle irons one at a time to the transporting means 12 by pushing the top angle iron off of the vertical stack until an end thereof is spaced from the stack, at which point the spaced end may be engaged by the transporting means 12 and moved by the transporting means 12 off of the stack. Under the influence of springs 26, when one angle iron is moved off the stack, the next angle iron comes up to the vertical position where it cooperates with the ram 32.

Various accessory devices may also be provided with the magazine 10. For instance, some sort of a detent means may be used for separating the top angle iron of the stack from the next angle iron for facilitating engagement thereof by the ram portion 33 and an automatic sensor may be provided for sensing the position of the arm 25 to determine when the magazine is empty to thereby actuate the cylinder 28 and facilitate reloading of the magazine. Other modifications are also possible. It is noted that the magazine according to the present invention takes up a minimum of floor space compared to horizontal positioning of angle irons for feeding, and provides for positive feeding of each angle iron into proper position for further treatment thereof.

Figure 4:
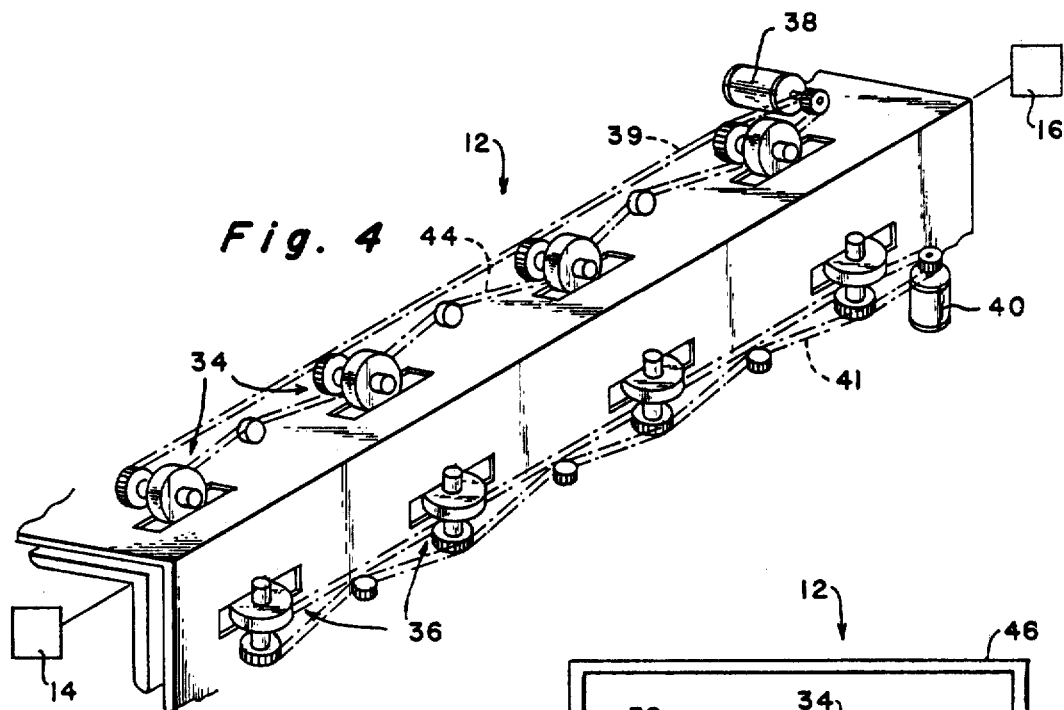
FIG. 4 is a perspective schematic showing of exemplary transporting means according to the present invention.
Figure 5:
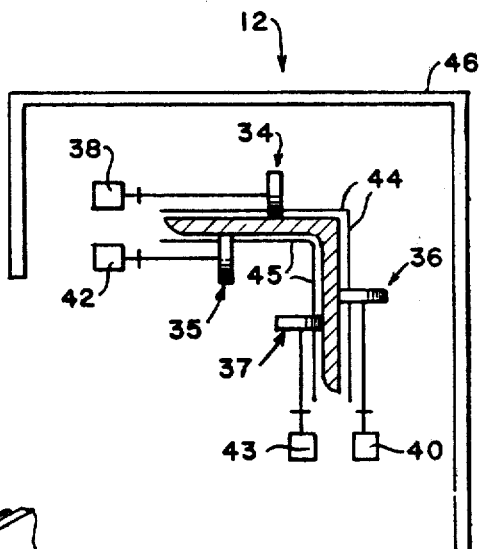
FIG. 5 is an end schematic view of the transporting means of FIG. 4.

The transporting means 12 engages a spaced end of the top angle iron in the vertical stack and then transports the angle iron off the stack to the punching means 14. As shown most clearly in FIGS. 4 and 5, the transporting means 12 may comprise a first plurality of top rollers 34, a first plurality of bottom rollers 35 cooperating with the top rollers 34, a second plurality of top rollers 36, and a second plurality of bottom rollers 37 cooperating with top rollers 36. The terms "top" and "bottom" are used in describing the transporting means 12 and are not intended to be limiting as far as orientation with respect to a vertical is concerned, but rather are for reference purposes only.

Figure 12:
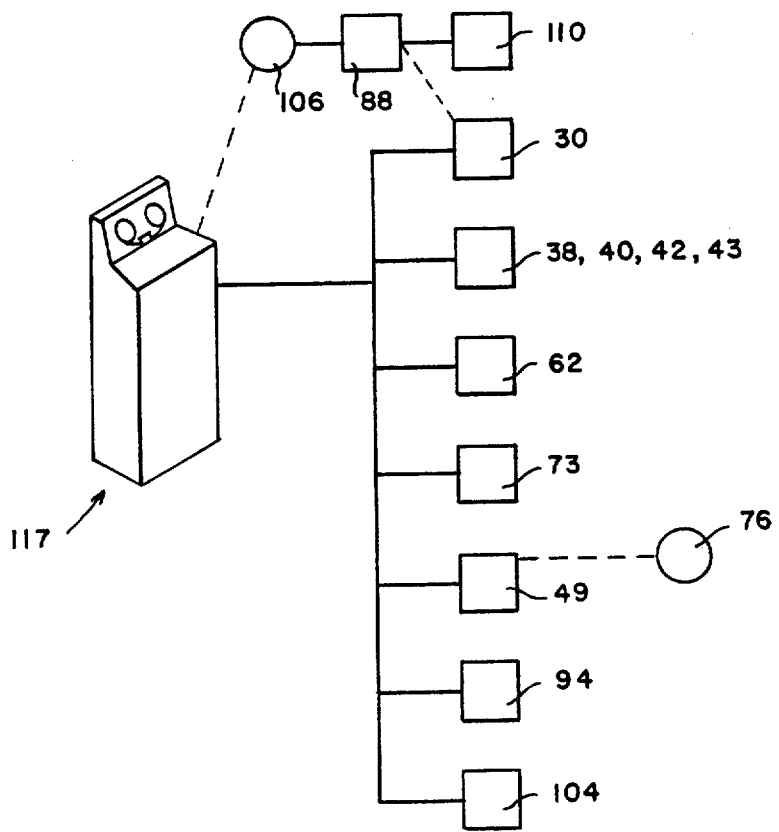
FIG. 12 is a diagrammatic showing of computer control means inter-connected to various other component parts according to the present invention.

The rollers of the sets 34 through 37 grip the angle iron D therebetween and, upon rotation of the rollers, linearly transport the angle iron in the feed direction A. The various rollers are spaced so that they positively engage angle iron D, or they can be spring biased or made of resilient material in order to effect positive gripping of the angle iron D. A separate motor may be provided for each set of rollers 34 through 37, such as motors 38, 40, 42 and 43 for the roller sets 34 through 37, respectively. A chain drive interconnects each motor with the rollers cooperating therewith, such as the chains 30 and 41 shown in FIG. 4. In that way, all the rollers of each set are driven with the same speed. Various mechanisms may be provided for synchronizing operation of the motors 38, 40, 42 and 43 as shown in FIG. 12.

Preferably, stationary guides are provided for mounting the rollers of each set for rotation. Such a stationary guide may include a top plate 44 and a bottom plate 45, the rollers of sets 34 and 36 extending through the plate 44 to engage top planar surfaces of the angle iron D, while rollers of the sets 35 and 37 extend through openings in the bottom plate 45 to engage bottom planar faces of the angle iron D. Of course, the shape of the plates 44,45 may be accommodated depending upon the shape of the angle iron to be handled thereby and, for certain shapes of rails, etc., not all of the roller sets 34 through 37 need be employed. A common cover 46 may cover all of the component parts of the transporting means 12 to insure operator safety. Control of all of the motors 38, 40, 42 and 43 may be provided from a central control station, as shown diagrammatically in FIG. 12.

Figure 7:
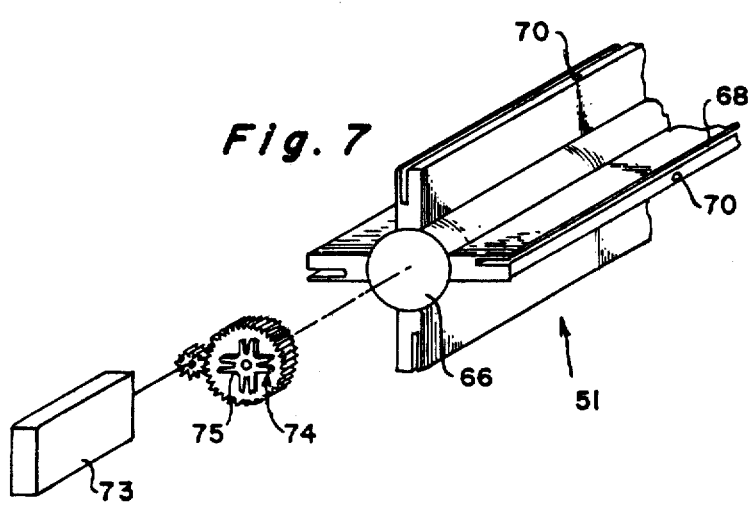
FIG. 7 is an exploded view of the female dies assembly of FIG. 6.
Figure 6:
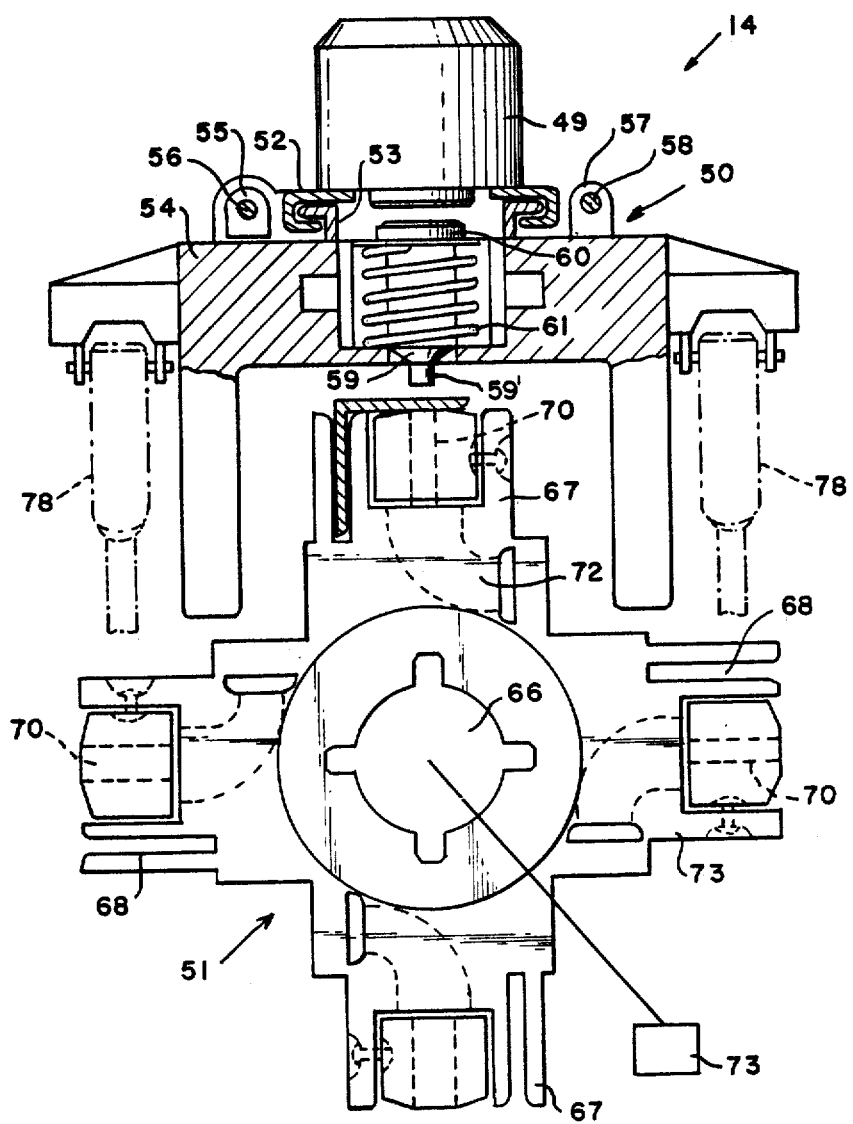
FIG. 6 is an end view, partly in elevation and partly in cross-section, of exemplary punching means according to the invention.
Figure 8:
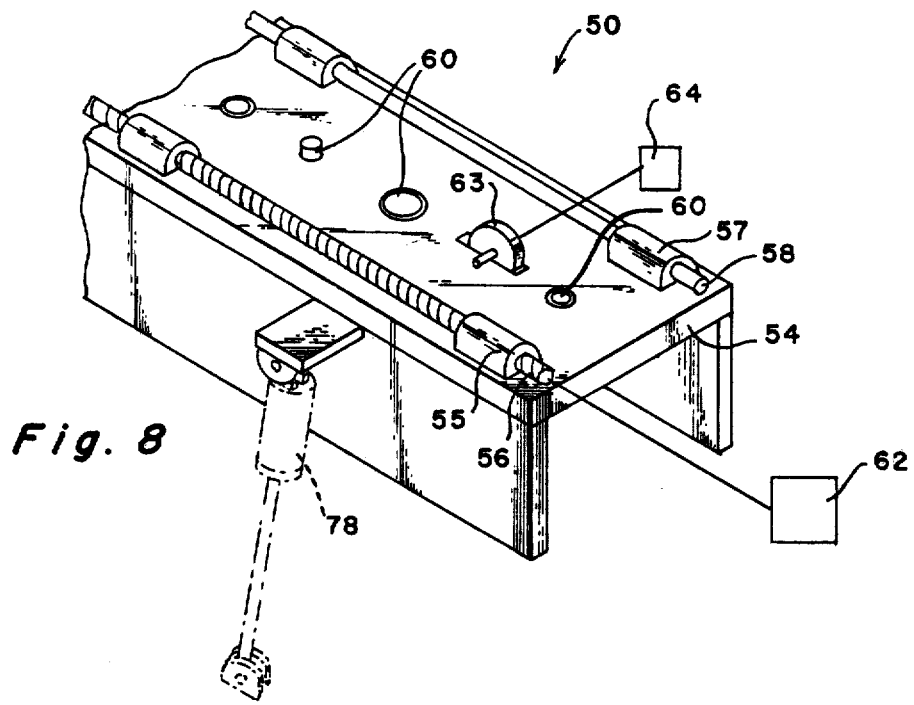
FIG. 8 is a perspective detail view of the male dies assembly of FIG. 6.

The punching means 12, according to the present invention, is shown most clearly in FIGS. 6 through 8 and includes three major components: a stationary punch 49 (preferably pneumatic or hydraulic), a male dies assembly 50 and a female dies assembly 51. Guides 52 and 53 formed on the punch 49 and male dies assembly 50, respectively, provide for guided movement of the assembly 50 with respect to the stationary punch 49.

The male dies assembly 50 includes a body 54 having a travelling nut collar 55 associated therewith which cooperates with a screw rod 56. Rotation of the screw rod 56 by a power source (such as 62 shown in FIG. 8) effects linear movement of the body 54 with respect to the punch 49. A guide collar 57 and cooperating guide rod 58 may also be provided for guiding the linear movement of the body 54 with respect to the punch 49. A plurality of male dies 59 are provided in the body 54 substantially contained within the body 54, a male die 59 being provided for each potential hole size to be punched in an angle iron. Four such dies 59 are shown in FIG. 8. Each die 59 comprises a work-engaging portion 59′ extending from one end of the body 54 and a punch-engaging portion 60 extending from the other end of the body 54. A spring 61 provides bias of the die 59 so that the work-engaging portion 59′ is normally out of interfering relationship with an angle iron D. Upon movement of the block 54 so that the selected male die 59 is under the punch 49, the punch 49 is actuated which causes the work-engaging portion 59′ of the die 59 to engage and penetrate a face of the angle iron D and thereby punch a hole of desired size therein.

In order to facilitate continued movement of the angle iron D from the punching position to the cutting position, one or more gripper wheels 63 (which may be spring biased into engagement with the angle iron D), with suitable power source 64 for rotation thereof, may be provided mounted with the block 54. While the transporting means 12 will normally be designed so that it is substantially as long as the maximum length of angle iron D to be handled thereby, means 12 will provide most of the motor force for moving the angle iron through the punching and cutting position and it is desirable, therefore, to provide one or more gripper wheels 63 with the punching means 14 in order to insure proper mode of force.

The female die assembly 51 includes a shaft 66 having a plurality of arms 67. Each arm 67 has a guide slot 68 therein for engaging a portion of the angle iron D to guide the angle iron and to positively hold the angle iron during punching, and a female die opening 70 formed therein. The opening 70 corresponds in size to the sizes of the various male dies 59 and four female dies 70 are shown in FIGS. 6 and 7 for cooperation with the four male dies 59 of FIG. 8. Each female die opening 70 communicates with a blank disposal slot 72 which allows passage of the blanks punched from the angle iron D out of potential interfering relationship with the rest of the assembly. A suitable power source 73 is provided for rotation of the shaft 66, the source 73 being synchronized in operation with the source 62 (see FIG. 12) in order to insure that the proper cooperating male and female dies are selected and a gearing arrangement 74 may be provided for transferring the force from power source 73 to rotation of the shaft 66. A Geneva gear 75 or the like can be associated with the gearing 74 to affect indexing of the shaft 66 during its rotation to insure proper positioning of a female die opening 70 in place.

If desired, a photocell arrangement 76 (see FIG. 1) may be provided for sensing the position of the angle iron D to affect punching thereof. The photocell arrangement 76 may be tied into operation with a common control for all of the component parts (see FIG. 12). Also, a plurality of cylinders 78 may be provided for lifting the whole assembly 54 when it is desired to change the dies in the assembly 51. The cylinders 78 can be bled during the normal movement of 54 so as not to interfere therewith.

Figure 9:
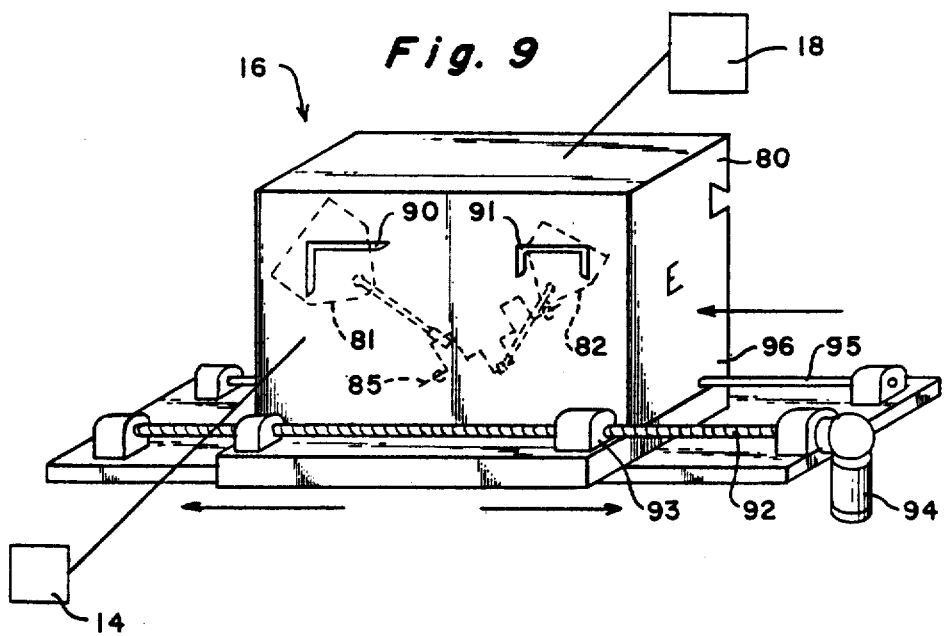
FIG. 9 is a perspective view of exemplary cutting means according to the invention.
Figure 10:
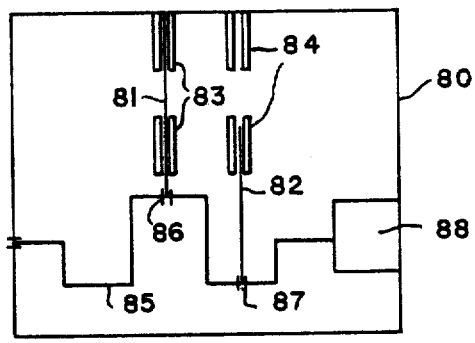
FIG. 10 is a side diagrammatic view of the cutting means of FIG. 9.

An exemplary cutting arrangement according to the present invention is shown in FIGS. 9 and 10, although other conventional cutters can be employed. The cutter 16 includes a body portion 80 with distinct means for cutting at least two differently-shaped angle irons. The body 80 includes a first cutting blade 81 and at least another, second, cutting blade 82. The cutting blades 81,82 are generally linearly movable to affect cutting of angle irons fed thereto and guide means 83,84 respectively (see FIG. 10) may be provided for guiding operation of the blades 81,82. The blades 81,82 are preferably connected to a common crankshaft 85 by mounts 86,87, respectively, the mounts 86,87 operatively connecting the blades 81,82 to the crankshaft 85 so that rotation of the crankshaft 85 results in generally linear movement of the blades 81,82. A single power source 88 may be provided for rotation of the crankshaft 85 and operation of the blades 81,82. A guide arrangement 89 may also be provided for guiding the movement of angle irons into the body 80 into operative relationship with the blades 81,82 and for holding the angle iron in place during cutting.

Preferably, two or more slots 90,91 are provided in the body 80 for receiving angle irons of different shapes. For instance, the slot 90 would receive conventional right angle, two-faced angle irons, while the slot 91 would receive conventional rails. The entire body 80 is mounted for movement with respect to the punching means 14 and the measuring means 18 to bring either the opening 90 or the opening 91 in place depending upon the particular angle iron being treated. The body 80 is movable in direction E (normal direction to feed direction A) by rotation of a screw rod 92, the screw rod 92 being received by a travelling nut collar 93 which forms part of the body 80, and rotation of rod 92 being affected by a stepping motor 94 or the like. A guide rod 95 and a guide collar 96 are also provided. A common control can be provided for the motor 94 and the motor 88, tying them to the rest of the operative components as shown in FIG. 12.

The measuring assembly 18 according to the present invention includes means for measuring the length of the angle iron D past the cutting position. Such means include a stopping abutment 100 mounted on a linearly movable (in direction A) carriage 101. A screw rod 102 and a guide rod 103 pass through the carriage 101 in operative engagement therewith and rotation of the screw rod 102 by the motor 104 transfers the rotational movement of the rod 102 into linear movement of the carriage 101 in direction A. In this way, the stopping position of the angle iron defined by the abutment 100 can be adjusted with respect to the cutting position. Additionally, a switch plunger 106 or the like can be mounted on the abutment 100 so that, upon depression of the switch plunger 106 by the angle iron, the cutting motor 88 is energized to effect cutting.

A guide rail 107 is associated with the measuring assembly 18 for guiding movement of an angle iron D into engagement with the abutment 100. Additionally, a shelf-support 108 is provided for supporting a guide rail D moving into the assembly 18, the shelf-support being pivoted by hinges 109 to the guide 107 and cylinders 110 being provided, pivotally mounted by means 111 to the shelf 108, for effecting movement of the shelf 108 about the pivot 109. Depending upon the shape of the rail to be measured, optional guides 113 may also be provided mounted on the shelf 108 for retaining the angle iron held by the shelf in position.

Upon actuation of cylinders 110, the shelf 108 may be pivoted about pivots 109 from the generally horizontal position shown in FIG. 11 to a downwardly pointing vertical position whereby the angle irons supported thereby will no longer have any vertical support and will fall from the assembly 18 in the direction B (see FIGS. 1 and 11) substantially normal to the direction A into the cart 115. The cut and punched angle irons will then stack themselves in the cart 115.

Separate means (not shown) may be provided for disposing of the unwanted remnants from the cut angle iron. Alternatively, since the unwanted portion of the cut angle iron will be retained by the slot 90,91 and/or by the slot 68 in one of the arms 67 of the female die assembly 51, the remnant portion will remain in position until the next angle iron is moved into engagement therewith. Upon movement of the next angle iron into engagement therewith, the remnant portion will be pushed entirely through the cutting means 16 and toward the measuring assembly 18. The remnant may then be disposed of by leaving the shelf 108 in its downwardly extending position until the remnant is disposed of so that the remnant will fall downwardly, or by moving the shelf to its horizontal position to hold the remnant initially and then subsequently again pivoting the shelf 108 downwardly to dispose of the remnant. The necessary sequence of control of the operational elements can be provided by the common control means shown in FIG. 12.

FIG. 12 shows the powered components of the structure illustrated in FIGS. 1 through 11 with a common control such as a conventional computer means 117. The computer means 117 cannot control all of the necessary elements by pre-programming to accommodate angle irons of any predetermined length to effect punching of any predetermined size therein and cutting of the angle irons to any predetermined length. Sensors 76 and 106 may cooperate with the various elements to effect the necessary sequence of operation and various components can be otherwise synchronized (for instance, the actuation of the motor 88 can initiate actuation of the ram 32).

According to the method of the present invention, a method is provided for acting on angle irons comprising the steps: providing a vertical stack of a plurality of angle irons, and substantially continuously, feeding the angle irons one at a time to a punching position; punching a hole in a face of the angle iron at the punching position; feeding the angle iron from the punching position to a cutting position in a linear direction of movement; automatically selectively determining the length of angle iron to be cut at the cutting position; cutting the angle iron at the cutting position to provide an angle iron of a given length; and removing each cut angle iron from the cutting position. The step of determining the length of angle iron to be cut is effected by measuring the length of angle iron in the direction of movement thereof past the cutting position. The step of feeding angle irons one at a time to the punching position is accomplished by sequentially moving the front angle iron in the stack off of the stack, the angle irons being biased so that, upon removal of one angle iron from the front of the stack, the next angle iron assumes a position previously taken by the removed angle iron. The size of the hole to be punched in a face of an angle iron is selected from a number of possible sizes, as by rotating a female die assembly 51 into operative relationship with respect to the face of the angle iron and moving a male die 59 assembly into operative relationship with the female die member. The components may be so dimensioned that the punching of each angle iron is effected at the same time as the length of the angle iron prior to cutting is being determined by the assembly 18.

An exemplary operation of the structure according to the invention will now be set forth: the cylinder 28 is activated to move the magazine 10 to a generally vertical position and a plurality of angle irons D are inserted into the magazine 10, depressing the arms 25 as they are inserted. Once a desired number of angle irons are provided in the magazine 10, the cylinder 28 is again activated to move the magazine to a generally vertical position as shown in FIG. 3.

Once the magazine 10 is in its vertical position, the ram 32 is actuated to push one end of the top angle iron D slightly off of the stack. The free end is engaged by the gripper wheels 34 through 37 of the transporting assembly 12 (the angle iron contour being lined up with the wheels), which positively moves the angle iron in direction A toward the punching assembly 14. The computer control means 117 operates the motors 62 and 73 of the punching assembly 14 to select the male and female dies 59,70 of the desired size. The computer control means 117 then actuates the punch 49 when the angle iron D is in proper position (which may be sensed by the photocell 76) to depress the die 59 and move the working portion 59' thereof through the angle iron D; the blank passing out through the opening 72. The computer control means controls the motors 62,73 and punch 49 to effect punching of any number of holes in the angle iron D by the means 14. The conveyance of the angle iron with respect to the punching means 14 may be arrested for a short period of time during the punching operation or the entire punching assembly may be moved at the same speed as the angle iron during punching to effect continuous operation.

The punched angle iron D passes from the punching assembly to the selected opening 90,91 in the cutting assembly 16, the motor 94 having moved the cutter body 80 in direction E so that the proper opening 90,91 receives the angle D. The length of angle iron D past the cutting position is measured by means 18. The computer control means 117 has operated motor 104 to position abutment 100 at the predetermined distance with respect to the cutting position. Once the angle iron D hits abutment 100, the cutting motor 88 is actuated to move the appropriate cutting blade 81,82 to effect cutting of the angle iron by cutting means 16. After cutting, the computer control means 117 actuates the cylinders 110 to pivot the shelf 108 downwardly and thereby release the angle iron D to fall into the cart 115. The remnant of the angle iron may be disposed of by feeding the next angle iron into place in the cutting means 16 to push the remnant out of the cutting means 16, so that it falls when not supported by the shelf 108. The operation is substantially continuous (being arrested only momentarily during punching and cutting where necessary) and the computer control means 117 can be programmed to provide completely automatic operation.

While the invention has herein been shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and methods.

I claim:

1. Apparatus for automatic punching and cutting of angle irons or the like comprising:

means for providing a supply of angle irons to be cut;
means for transporting said angle irons away from said supply means;
means for punching holes of predetermined size in an angle iron at a punching position;
means for automatically determining the length of angle iron to be cut at a cutting position; and
means for cutting an angle iron at the cutting position to provide an angle iron of predetermined length, said cutting means comprising: a crankshaft having in-line bushings supporting it for rotation; means for rotating said crankshaft; at least one cutting blade operatively connected to said crankshaft, at a portion thereof offset from a line between the bushings, for generally linear movement in response to rotation of said crankshaft; guide means for guiding the linear movement of said blade; a common cutter housing with distinct means for cutting at least two differently-shaped angle irons; means for moving said cutter housing so that one or the other of said distinct cutting means is brought into play; at least two cutting blades operatively mounted to said crankshaft to effect angle iron cutting; and guide means for guiding the movement of said cutting blades during cutting movement thereof.

* * * * *